United States Patent
Kuno et al.

(10) Patent No.: US 12,472,869 B2
(45) Date of Patent: Nov. 18, 2025

(54) SYSTEMS AND METHODS FOR DRIVER WARNINGS UPON CHILD IDENTIFICATION AND BYPASS OPTIONS BASED ON GESTURE AND POSTURE DETECTION

(71) Applicants: Joyson Safety Systems Acquisition LLC, Auburn Hills, MI (US); Joyson Safety Systems Japan G.k., Shiga (JP)

(72) Inventors: Katsuji Kuno, Echigawa (JP); Babak Bakhtiar, Richmond Hill (CA); Joshua Ramaglia, Broken Arrow, OK (US)

(73) Assignees: Joyson Safety Systems Acquisition LLC, Auburn Hills, MI (US); Joyson Safety Systems Japan G.K., Shiga (JP)

( * ) Notice: Subject to any disclaimer, the term of this patent is extended or adjusted under 35 U.S.C. 154(b) by 74 days.

(21) Appl. No.: 18/052,759

(22) Filed: Nov. 4, 2022

(65) Prior Publication Data

US 2023/0138431 A1    May 4, 2023

Related U.S. Application Data

(60) Provisional application No. 63/275,942, filed on Nov. 4, 2021.

(51) Int. Cl.
| | |
|---|---|
| *B60Q 9/00* | (2006.01) |
| *G06F 3/01* | (2006.01) |
| *G06V 10/764* | (2022.01) |
| *G06V 20/59* | (2022.01) |
| *G06V 40/20* | (2022.01) |
| *H04N 23/611* | (2023.01) |

(52) U.S. Cl.
 CPC ............. *B60Q 9/00* (2013.01); *G06F 3/017* (2013.01); *G06V 10/764* (2022.01); *G06V 20/597* (2022.01); *G06V 40/20* (2022.01); *H04N 23/611* (2023.01)

(58) Field of Classification Search
 CPC ........ B60Q 9/00; G06V 20/597; G06V 40/20; G06V 10/764; H04N 23/611; G06F 3/017
 USPC ...................................................... 340/426.34
 See application file for complete search history.

(56) References Cited

U.S. PATENT DOCUMENTS

| | | | | |
|---|---|---|---|---|
| 5,686,765 | A | * | 11/1997 | Washington ....... G07C 9/00563 340/426.36 |
| 5,905,210 | A | | 5/1999 | O'Boyle et al. |
| 5,918,696 | A | | 7/1999 | VanVoorhies |
| 5,927,427 | A | | 7/1999 | Sewell et al. |

(Continued)

*Primary Examiner* — Brian A Zimmerman
*Assistant Examiner* — Thang D Tran
(74) *Attorney, Agent, or Firm* — Meunier Carlin & Curfman LLC

(57) ABSTRACT

A passenger protection system for a vehicle includes a vehicle sensor control system receiving input data from a plurality of vehicle sensors and from image data that corresponds to gestures presented by an occupant in the vehicle. The gesture is interpreted by a digital control sequence software to control an alert system in the vehicle used to prevent an occupant leaving a child unattended in the vehicle. The digital control sequence is configured for activating and de-activating an alert system after confirming the validity of gesture commands originating from authorized occupants. The alert system includes at least one of an audible alert and/or a visible alert and/or haptic alert that can be controlled according to the image data collected by an imaging device.

20 Claims, 10 Drawing Sheets

(56) References Cited

U.S. PATENT DOCUMENTS

| | | | |
|---|---|---|---|
| 5,957,491 A | 9/1999 | Cech et al. | |
| 5,979,585 A | 11/1999 | Van Voorhies | |
| 5,984,349 A | 11/1999 | Van Voorhies | |
| 5,986,221 A | 11/1999 | Stanley | |
| 6,021,863 A | 2/2000 | Stanley | |
| 6,045,155 A | 4/2000 | Cech et al. | |
| 6,056,079 A * | 5/2000 | Cech | B60N 2/002 177/144 |
| 6,069,325 A | 5/2000 | Aoki | |
| 6,076,853 A | 6/2000 | Stanley | |
| 6,109,117 A | 8/2000 | Stanley et al. | |
| 6,323,444 B1 | 11/2001 | Aoki | |
| 10,322,728 B1 * | 6/2019 | Porikli | G06V 10/764 |
| 10,525,934 B1 * | 1/2020 | Gilbert-Eyres | B60R 25/102 |
| 10,551,936 B2 * | 2/2020 | Yamamoto | G06F 3/04883 |
| 10,611,335 B2 | 4/2020 | Cech et al. | |
| 10,672,247 B2 * | 6/2020 | Yang | A61B 5/002 |
| 10,708,700 B1 * | 7/2020 | Salter | H04R 1/025 |
| 11,107,340 B1 * | 8/2021 | Cozzolino | G08B 21/02 |
| 11,198,388 B1 * | 12/2021 | Crose | G08B 21/24 |
| 11,230,191 B1 * | 1/2022 | Yatooma | B60K 35/00 |
| 11,373,462 B2 * | 6/2022 | Reibling | B60Q 9/00 |
| 11,853,469 B2 * | 12/2023 | Wieczorek | G09G 3/342 |
| 2002/0152010 A1 * | 10/2002 | Colmenarez | G06F 18/256 340/426.1 |
| 2003/0132950 A1 * | 7/2003 | Surucu | G06F 3/04886 715/700 |
| 2005/0057350 A1 * | 3/2005 | Younse | G08B 21/22 340/457.1 |
| 2006/0273917 A1 * | 12/2006 | Rams | G08B 21/02 340/667 |
| 2009/0040036 A1 * | 2/2009 | Talis | B60N 2/0025 340/457.1 |
| 2011/0295469 A1 * | 12/2011 | Rafii | E05F 15/43 701/49 |
| 2012/0232749 A1 * | 9/2012 | Schoenberg | B60N 2/0022 340/457 |
| 2013/0314536 A1 * | 11/2013 | Frank | B60H 1/00742 348/148 |
| 2014/0310739 A1 * | 10/2014 | Ricci | G06F 3/013 725/75 |
| 2015/0015710 A1 * | 1/2015 | Tiryaki | G06F 3/0304 348/148 |
| 2016/0059777 A1 * | 3/2016 | Malone | B60Q 9/00 340/426.1 |
| 2016/0090103 A1 * | 3/2016 | Tan | G06F 3/014 345/156 |
| 2016/0144783 A1 * | 5/2016 | Mroczek | G08B 21/24 340/457 |
| 2016/0187992 A1 * | 6/2016 | Yamamoto | G06F 3/017 345/156 |
| 2016/0249191 A1 * | 8/2016 | Avrahami | H04L 67/12 |
| 2016/0272150 A1 * | 9/2016 | Doshi | G08B 23/00 |
| 2016/0379466 A1 * | 12/2016 | Payant | G08B 21/22 340/457 |
| 2017/0113618 A1 * | 4/2017 | Deyaf | B60C 9/00 |
| 2017/0166121 A1 * | 6/2017 | Biondo | B60Q 5/005 |
| 2017/0247927 A1 * | 8/2017 | Elie | E05F 15/611 |
| 2017/0247933 A1 * | 8/2017 | Elie | E05F 15/73 |
| 2017/0316533 A1 * | 11/2017 | Goldman-Shenhar | G08G 1/205 |
| 2017/0368994 A1 * | 12/2017 | Gieseke | G06V 20/597 |
| 2018/0015933 A1 * | 1/2018 | Truong | G06F 3/04817 |
| 2018/0022233 A1 * | 1/2018 | Maguire | B60R 21/015 701/46 |
| 2018/0025604 A1 * | 1/2018 | Protopsaltis | B60N 2/0035 340/457 |
| 2018/0025636 A1 * | 1/2018 | Boykin | G08G 1/096725 701/1 |
| 2018/0111506 A1 * | 4/2018 | Penna | B60N 2/002 |
| 2018/0186321 A1 * | 7/2018 | Naghizadeh | B60R 21/01534 |
| 2018/0326944 A1 * | 11/2018 | Cech | G06V 20/593 |
| 2019/0092169 A1 * | 3/2019 | Thurimella | G06F 3/011 |
| 2019/0095733 A1 * | 3/2019 | Wang | B60N 2/0273 |
| 2019/0147273 A1 * | 5/2019 | Hyuga | B60W 40/08 340/425.5 |
| 2020/0017069 A1 * | 1/2020 | Galan-Oliveras | G06V 40/103 |
| 2020/0103980 A1 * | 4/2020 | Katz | B60K 35/00 |
| 2020/0207358 A1 * | 7/2020 | Katz | G02B 27/0093 |
| 2020/0210737 A1 * | 7/2020 | Kapuria | G06V 20/597 |
| 2020/0211354 A1 * | 7/2020 | Kapuria | G08B 21/02 |
| 2020/0320318 A1 * | 10/2020 | Ramaglia | G06V 20/59 |
| 2020/0320841 A1 * | 10/2020 | Sim | E05F 15/72 |
| 2020/0404147 A1 * | 12/2020 | Kadomae | B60R 11/04 |
| 2021/0024034 A1 * | 1/2021 | Uebel | B60R 25/403 |
| 2021/0046868 A1 * | 2/2021 | Wen | B60Q 9/00 |
| 2021/0061170 A1 * | 3/2021 | Krishnaswamy | B60Q 5/005 |
| 2021/0097315 A1 * | 4/2021 | Carruthers | G08B 13/19645 |
| 2021/0097465 A1 * | 4/2021 | Rao | H04W 4/46 |
| 2021/0245763 A1 | 8/2021 | Gomez et al. | |
| 2022/0041116 A1 * | 2/2022 | Lev | H04B 1/3822 |
| 2022/0180666 A1 * | 6/2022 | Rose | B60K 35/00 |

* cited by examiner

SYSTEMS AND METHODS FOR DRIVER WARNINGS UPON CHILD IDENTIFICATION AND BYPASS OPTIONS BASED ON GESTURE AND POSTURE DETECTION

CROSS REFERENCE TO RELATED APPLICATIONS

This application claims priority to and incorporates by reference U.S. Provisional Patent Application Ser. No. 63/275,942 filed on Nov. 4, 2021, and entitled Systems and Methods for Driver Warnings Upon Child Identification and Bypass Options Based on Gesture and Posture Detection.

BACKGROUND

The present disclosure relates generally to the field of sensing methods to detect a child in a vehicle to warn a driver or other adult that the child is still present before the driver or adult exits the vehicle. More specifically, the disclosure relates to detecting a presence and a safety status of children in a vehicle by using combinations of occupant detection sensors in the vehicle. The occupant detection sensors include, but are not limited to, capacitive sensing systems, weight sensing systems, and occupant monitoring camera systems to prevent a child from being left unattended in a vehicle. The term "vehicle" as used herein includes all of the broadest plain meanings for the term within the context of transportation (i.e., any references to an automobile are for example purposes only and do not limit this disclosure to any one embodiment). Occupant monitoring camera systems may include any kind of imaging device, light sensitive arrays, infrared and visible light image sensors, lidar assemblies, and radar technology for imaging an interior of a vehicle and occupants therein.

Every year brings more incidents of children being accidentally left unattended in a vehicle with the adult in the car leaving the vehicle without realizing that the child has been left behind. Without the ability to exit on their own, the children face the dangers of extreme temperatures and even accidental death. There is a need for a system and method for accurately detecting that a child is present in the vehicle and that the adult is attempting to exit the vehicle while the child is still inside. A warning can be provided to the adult/driver as needed to remind the adult to check on all children who might be left in the car. This disclosure, furthermore, includes methods and systems for minimizing alarm error rates caused by false identification of occupants and vehicle conditions because those problems have been prevalent in earlier systems.

One preliminary aspect of providing a warning that a child is being left behind lies in determining that a child is in the vehicle at all, and then, preferably, determining that the child is of a size and/or age that would likely be unsafe if left unattended for an extended period. Numerous systems have been developed for differentiation of an adult driver, an adult passenger, a child occupant, and an inanimate object placed on a seat in an occupant classification system. For example, U.S. patent application Ser. No. 15/655,542, published as Pub. No. 2018/0022233 and incorporated by reference herein, explains examples of occupant detection and classification systems. In certain earlier occupant classification systems, an occupant detection system may include a seat weight sensor and/or an electric field sensor, each operatively connected to a controller for detecting an occupant in a vehicle. The seat weight sensor is adapted to generate a measure of weight upon the vehicle seat, e.g. upon the associated seat bottom. The electric field sensor may include at least one electrode located, for example, in the seat bottom under the seat cover and close to the top of a foam cushion, and adapted to enable detection of a type of occupant or object that may be upon the seat bottom of the vehicle seat.

The seat weight sensor is responsive to a force upon the vehicle seat. The seat weight sensor, for example, may include one or more load cells operatively coupled to at least one load path between the seat bottom and the vehicle, e.g., between the seat frame and the floor pan of the vehicle, e.g. at the corners of the seat frame, so as to measure the weight of the entire vehicle seat and objects or occupants placed thereon. For example, the one or more load cells could use a strain gauge, a magnetic-restrictive sensing element, a force sensitive resistive element, or another type of sensing element to measure the associated load. For example, the seat weight sensor may be constructed in accordance with the teachings of U.S. Pat. Nos. 5,905,210, 6,069,325 or 6,323,444, each of which is incorporated herein by reference.

The seat weight sensor may alternately include at least one mass sensing element, e.g. a force sensitive resistive element, a membrane switch element, a pressure sensitive resistive contact, a pressure pattern sensor, a strain gage, a bend sensor, or a hydrostatic weight sensing element, operatively coupled to one or more seating surfaces in the seat base or seat back, e.g. in accordance with the teachings of U.S. Pat. Nos. 5,918,696, 5,927,427, 5,957,491, 5,979,585, 5,984,349, 5,986,221, 6,021,863, 6,045,155, 6,076,853, 6,109,117 or 6,056,079, each of which is incorporated herein by reference. For example, the seat sensor may have a hydrostatic sensing element—e.g. a fluid containing bladder, underneath the seat cover of the seat bottom and supported by the seat frame—wherein a pressure sensor operatively connected to the bladder measures the pressure of the fluid contained therein so as to provide a measure of occupant weight. The pressure sensor is operatively connected to the controller so as to provide a pressure signal thereto, which determines a measure of weight therefrom.

Other occupant detection systems include an "electric field sensor," referring to a sensor that generates a signal that is responsive to the influence that an individual or object being sensed has upon an electric field. One form of electric field sensor is a capacitive sensor, wherein the capacitance of one or more electrodes is measured—from the relationship between received and applied signals—for a given electrode configuration. What has commonly been referred to as capacitive sensing actually comprises the distinct mechanisms of what is referred to as "loading mode," "shunt mode", and "transmit mode" which correspond to various possible electric current and/or electric field pathways. In the "shunt mode", a voltage oscillating at low frequency is applied to a transmit electrode, and the displacement current induced at a receive electrode is measured by sensing electronics, whereby the displacement current may be modified by the body being sensed. In the "loading mode", the object to be sensed modifies the capacitance of a transmit electrode relative to ground. In the "transmit mode", the transmit electrode is put into circuit transmission with the user's body, which then becomes a transmitter relative to a receiver, either by direct electrical connection or via capacitive coupling.

Accordingly, the electric field sensor is either what is commonly known as a capacitive sensor, or more generally an electric field sensor, operating in any of the above described modes. The electric field sensor may include at least one electrode operatively coupled to at least one applied signal so as to generate an electric field proximate to the at least one electrode, responsive to the applied signal. The applied signal, for example, includes either an oscillating or pulsed signal. At least one electrode is operatively coupled to a sensing circuit that outputs at least one response signal responsive to the electric field at the corresponding electrode wherein the response signal is responsive to at least one electric-field-influencing property—for example, dielectric constant, conductivity, size, mass or distance—of an object proximate to the electric field sensor. For example, for the electric field sensor as a capacitance sensor, the sensing circuit measures the capacitance of at least one electrode with respect to either another electrode or with respect to a surrounding ground, for example, a seat frame of the vehicle seat, connected to circuit ground. The at least one applied signal is, for example, generated by the sensing circuit that also outputs the at least one response signal. The sensing circuit and associated at least one applied signal may be adapted to be responsive to the influence of a water soaked vehicle seat, on measurements from the electric field sensor.

The sensors described above may detect, and record with a computer, an empty vehicle seat, an infant seat, a child seat, or a booster seat on the vehicle seat with or without an infant or child seated therein. The sensors also distinguish adult passengers in seats, conductive objects on seats, or an occupant on the vehicle seat in a position that is substantially different from a normal seating position. The at least one electrode may be, for example, located under the seat cover and substantially the same size as a region to be sensed on the vehicle seat, extending from near the back of the seat bottom to near the front of the seat bottom.

In some non-limiting embodiments, the electric field sensor has a relatively short range and principally senses an occupant when a large surface of the occupant is relatively close to the sensor. Occupants normally seated directly on the seat cover typically have a large surface of their body relatively close to the electrode. When infants or children are in child seats, most of their body is elevated several inches off the seat bottom surface, resulting in a relatively small influence upon the electric field sensor. The electric field sensor in the seat bottom distinguishes between a large body immediately above the seat cover—for example a normally seated, forward facing teen or adult occupant in the seat—and an infant or child seat—including rear facing, front facing and booster seats—that are located on a vehicle seat. When the vehicle seat contains a child seat (including a rear facing infant seat, a forward facing child seat and a booster seat), or when the vehicle seat is empty, no forward facing occupant is detected near to the seat bottom and, as a result, the electric field sensor can communicate the occupant status to a computer.

An electrode of the electric field sensor may be constructed in a variety of ways, and the method of construction is not considered limiting. For example, an electrode may be constructed using rigid circuit board or a flexible circuit using known printed circuit board techniques such as etching or deposition of conductive materials applied to a dielectric substrate. Alternately, an electrode may comprise a discrete conductor, such as a conductive film, sheet or mesh that is distinct from or an integral part of the vehicle seat or components thereof. The assembly of one or more electrodes together with the associated substrate is sometimes referred to as a sensing pad or a capacitive sensing pad.

The above described technology has also been incorporated in occupant classification systems using a heater as a sensor. The seat may include a heater controller to regulate the heaters in the seat bottom and/or the seat back and an electronic control unit (ECU) coupled to the sensors in the seat bottom and/or seat back to detect and categorize an object or occupant in the seat. The ECU may include sensing and measurement circuits. If the sensor is integrated into the heater system, the heater controller and the ECU may be connected in series such that power and/or control signals may be provided to the conductor (i.e., sensing and heater device) by, for example, the heater controller through the ECU. While the heater controller and the ECU are often provided under the seat bottom of a vehicle, in various embodiments the heater controller may be provided elsewhere in the vehicle.

Up until recent developments, the Occupant Classification Systems of the prior art have depended upon either the above noted capacitive sensing methods or a seat weight rail system. A seat weight rail system measures deflection of the seat rails and determines a weight on the seat. This gives 5 states of measurement: 1 yo, 3 yo, 6 yo, 5th female, 50th male. This system is expensive and heavy (a concern for electric vehicles).

Embodiments of an Occupant Classification System using seat weight rail systems, capacitive sensing, and heater as a sensor embodiments have been heavily scrutinized by regulatory bodies in the United States and abroad. For example, in the United States, the Federal Motor Vehicle Safety Standard No. 208 (FMVSS 208) has recognized deficiencies in the use of capacitive sensing and heater as a sensor embodiment for occupant classification. In particular, these prior embodiments do not adequately provide clear occupant classification distinctions between vehicle occupants that, with the technology described above, must be grouped together. For example, in the case of capacitive sensing, the system may not always be accurate enough to provide classification beyond "large" (e.g., 5th percentile sized female and larger) and "small" (infant or empty vehicle seat). A system of occupant classification, using capacitive sensing, for example, may distinguish a general division in classes with infant—female separation in weight classes providing the only classification threshold. This threshold, however, does not provide the best resolution to distinguish the characteristics of occupants within the large and small categories.

In non-limiting embodiments of occupant classification systems, an Infant-Female separation is sometimes a weight based measurement system using capacitance as described above but only provides a two state solution. Several publicly available charts promulgated by the National Highway Traffic Safety Administration show how the United States regulation FMVSS 208 has mapped certain un-identifiable and non-classifiable grey zones in traditional occupant classification systems, namely a system using a heater as a sensor technology for capacitive sensing. The grey zones in these public documents reflect that currently used occupant systems are largely ineffective to determine physical characteristics, and associated safety protocols, when occupants are between the traditional small and large classifications (e.g., small adults sized larger than a six year old child and smaller than a $5^{th}$ percentile female, as well as adults sized between $5^{th}$ percentile females and $50^{th}$ percentile males). The following table shows certain categories used today to illustrate occupant classification:

| | |
|---|---|
| 1 YO | 1 Year Old Infant |
| 3 YO | 3 Year Old Child |
| 6 YO | 6 Year Old Child |
| 5$^{th}$ Fe | 5$^{th}$ Percentile Female by Weight - Live |
| 50$^{th}$ Male | 50$^{th}$ Percentile Male by Weight - Live |

Again, these categories show unreliable grey zones between a six year old child and a small adult who can weigh significantly less than 100 pounds. The same kind of grey zone is present between females weighing over 120 pounds and men weighing, for example, under 135 pounds. Accuracy in these categories is extremely important in regulations dictating how vehicle manufacturers design vehicle seats, air bag deployment statuses, and numerous safety features in a vehicle. Upon the above considerations, new guidelines from regulatory bodies such as the United States New Car Assessment Program via the National Highway and Transportation Safety Administration require improved occupant classification technologies to remedy the grey zones in traditional classification systems. In fact, certain prior art technology, such as older seat track position sensors, will no longer be allowed for occupant classification purposes.

Attempts to cure the problems with the above described grey zones have brought forth newer and more advanced Occupant Monitoring Systems. In one commonly owned disclosure set forth in U.S. Ser. No. 16/841,154, published as U.S. Pub. No. 2020/0320318, incorporated by reference herein, a vehicle cabin monitoring system includes an image sensor connected to a computer processor and computer memory storing software that controls the image sensor, wherein the image sensor is positioned to capture images of at least a portion of a vehicle interior. At least one reference structure may be positioned in the vehicle cabin within a field of view of the image sensor. In some non-limiting embodiments, an optically active component is positioned on the reference structure, such that the reference structure incorporates a lighted surface that is included within at least one of the images. A sequence of the images shows differences regarding the lighted surface of the reference structure, and differences in the images indicate at least one status change of at least one item in the vehicle interior. In other embodiments, the image sensor may be incorporated into a system that detects and tracks physical features of occupants in a vehicle, as explained in commonly owned the disclosure set forth in U.S. patent application Ser. No. 15/834,664, published as U.S. Pub. No. 2018/0186321, incorporated by reference herein.

For the purpose of this disclosure, one non-limiting example of an active optical image sensor is a 3-D Time of Flight camera that can emit sinusoidal light using LED(s) or laser diode(s) with a center wavelength of approximately 850 nm and a range of +/−50 nm. The camera includes an image sensor having a pass band filter using the same center wavelength of 850 nm (or any other chosen wavelength) and corresponding range so that the image sensor is sampled at two or more equally spaced times during the light source sine wave (DT1, DT2, . . . ). By using a very fast sine wave, compared to the fastest possible movement of objects, the detected "point cloud image" represents a three-dimensional snapshot of the image sensor field of view. The duration for which the camera integrates collected light at these sampling times (e.g. integration times) can also be controlled within the image sensor. The intensity of the light reaching the image sensor is a function of the emitted light wavelength range, intensity and phase, the location (distance) of objects within the field of view, the size and orientation of the objects, and other factors such as the surface characteristics of the objects (e.g. material reflectivity in the sensor detector wavelength range, macroscopic/microscope surface normal, e.g., rough or smooth).

For the purpose of this disclosure, an example application is defined as an Occupant Monitoring System (OMS). In this non-limiting example, a 3-D TOF sensor is fixed within a vehicle and collects sequential point cloud images which are used by computer algorithms to discretely or continuously monitor the full cabin to the extent that a camera field of view and range make the full cabin view possible. The OMS also encompasses human occupants and objects within the cabin.

In at least one embodiment, the OMS imaging system may use alternative imaging technology such as LIDAR and radar imaging. These technologies are well understood and are compatible with vehicle control systems. This disclosure explains how use of these imaging technologies, particularly radar, can help vehicle manufactures meet regulatory requirements and protect individuals who may be left unattended in a vehicle.

For example, current European regulations are driving original equipment manufacturers (OEMs) and Tier 1 component suppliers to detect the presence of children in the cabin after the vehicle has been turned off. The same regulations may be implemented in other parts of the world, especially within the United States after so many accidental deaths due to "hot car" syndrome hurting or even killing unattended children. In one non-limiting example, the imaging technology of interest may be radar, but lowering the threshold for false positives and false negatives with radar-only solutions is desirable by all OEMs to reduce alarm fatigue. Increasing the resolution of the radar can only be done so much without the power becoming prohibitive, and sensor fusion techniques (i.e., inputs from multiple radars, lidars and cameras to form a single model or image) are promising, but generally considered too expensive for a baseline solution that is needed for the first stage in meeting the CPD requirements.

As noted above, a need exists in the art of occupant detection, particularly child safety detection, for better accuracy in providing warnings to adults in a vehicle that a child is in the vehicle and may be accidentally left unattended. One non-limiting goal, therefore, is to address alarm fatigue that is prevalent when too many false positive conditions trigger an alarm or alert. Occupants tend to disregard alarms that are incorrectly activated on a regular basis. A higher accuracy rate for child detection alarms can ensure greater adult diligence in preventing accidental harm to children left unattended in vehicles.

BRIEF SUMMARY OF THE DISCLOSURE

In one embodiment, a passenger protection system for a vehicle includes a vehicle control system comprising at least one processor and computerized memory storing vehicle control software therein, wherein the vehicle control software receives input data from a plurality of vehicle sensors. A digital control sequence is triggered in the software by a presence of at least one occupant other than a driver in the vehicle, the digital control sequence activating and de-activating an alert system on a door of the vehicle, and the alert system includes at least one of an audible alert and/or a visible alert and/or a haptic alert on the door of the vehicle.

In another embodiment, a passenger protection system for a vehicle includes a vehicle sensor control system in data communication with at least one processor and computerized memory/computerized storage for storing vehicle control software therein, wherein the vehicle control software receives input data from a plurality of vehicle sensors. An occupant monitoring system is also connected to and in data communication with the plurality of sensors configured to identify a presence of a driver and at least one other occupant in the vehicle, the occupant monitoring system further having additional sensors classifying the driver and the other occupant according to a passenger classification system stored in the software. A digital control sequence may be triggered in the software by a presence of the at least one occupant other than a driver in the vehicle, the digital control sequence activating and de-activating an alert system within the vehicle. The alert system may include at least one of an audible alert and/or a visible alert and/or a haptic alert. These alerts may be associated with corresponding hardware positioned on or in proximity to the at least one door of the vehicle. Additional sensors, whether OC sensors or OMS sensors, classifying the driver and the other occupant, configure the software to utilize the digital control sequence when a child is present in the vehicle, and that child is likely not able to care for themselves, cannot exit the vehicle by themselves, and should not be left unattended in a vehicle after all other occupants leave. As noted above, the additional sensors may include image sensors and other occupant classification sensors that classify the driver and the other occupant according to weight or size. The additional sensors and associated input data classifying the driver and the other occupant may be at least one of an imaging device, a seat belt sensor, a size sensor, a weight sensor, a capacitive sensor, and the like.

Another embodiment discloses a computer implemented method of preventing trapped passengers in a vehicle by first identifying a presence of a driver and at least one other occupant in the vehicle. When the at least one other occupant is a child that should not be left unattended in the vehicle, instructions in software implemented by a computer and processor in the vehicle activate an alert system on at least a door of the vehicle. The alert system may be at least one of an audible alert and/or a visible alert and/or a haptic alert on the door of the vehicle. Other positions for the alerts are also within the scope of this disclosure (i.e., using the vehicle horn or lights or sending remote alerts to a user's mobile device or cell phone). The method includes tracking respective positions of the driver and the at least one other occupant in the vehicle, such as by using image data to monitor occupant positions in the vehicle and possibly tracking vehicle operations with corresponding sensors. All of the input data may be received by at least one processor in the vehicle, stored in computerized memory, and used to populate instructions in control software. A computer uses the input data to determine that at least one of the driver and/or the occupant is exiting the vehicle and initiates the digital control sequence to provide the at least one of the audible alert and/or the visible alert and/or the haptic alert on at least one door of the vehicle prior to the exiting. In one non-limiting embodiment, the digital control sequence activates the alerts in an order such that the visible alert is followed by the haptic alert followed by the audible alert, until at least one of the driver and/or the other occupant provide manual feedback acknowledging respective alerts. In one example, in the absence of the manual feedback, the alert system provides audible warnings and/or visible warnings that are discernible from outside the vehicle. The acoustic warnings and/or visible warnings originate from at least one of a vehicle horn, vehicle headlights, or even a user's cell phone.

BRIEF DESCRIPTION OF THE DRAWINGS

These and other features, aspects, and advantages of the present invention will become apparent from the following description and the accompanying exemplary embodiments shown in the drawings, which are briefly described below.

DETAILED DESCRIPTION

Figure 1:
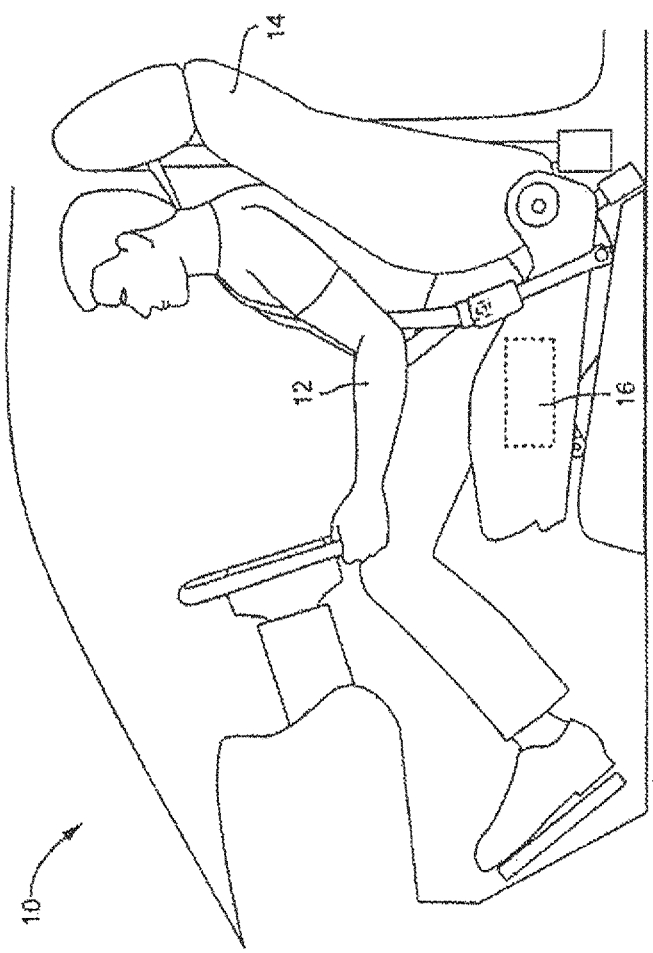
FIG. 1 is a schematic environmental depiction of an interior of a vehicle in which the aspects of this disclosure may be implemented.

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

This disclosure describes detection and warning systems that combine many different sensor inputs from technology and hardware connected to a vehicle, particularly within the interior of the vehicle. A radar imaging system, therefore, is just one kind of occupant monitoring sensor providing input to a vehicle control system and associated warning systems.

For example, a capacitive or electric field type sensor for use in an occupant classification system or occupant sensing system (for example, a system to detect occupancy of a vehicle seat) may be implemented in many ways. For example, according to one embodiment, an AC current may be provided to a sensing electrode located in a vehicle seat or other component, such as a steering wheel. The current or change in the current to the sensor may be measured and used as an indicator of the impedance from the sensing electrode to ground. In certain vehicle seat configurations, a seat heater may be provided.

In an occupant classification system, the occupant is classified using information from sensors that sense characteristics about the object located on a vehicle seat. Some systems sense the total weight on the seat. When a capacitive sensor is used to classify the occupant, the environment above the seat cover is sensed using various techniques to identify the dielectric and conductive properties of the occupant. A conductive sensing element is placed in the seat and, according to one embodiment, the impedance from the electrode to ground may be used as an indicator of the occupant situation above the seat cover.

The occupant detection and classification system is configured so that the environment below the seating surface does not influence the classification of the occupant. When a seat heater is provided, typically a resistive heater is employed. A resistive heater is essentially a grounded wire or conductor located in the vehicle seat. The sensing electrode for an occupant classification and detection system may be placed above the seat heater. If the orientation between the sensing electrode and the heater changes, the offset capacitance will change and the change may result in a negative impact on the ability of the system to accurately classify the occupant. For example, the detection system may be configured to include an offset for the measurement of an empty seat conduction. If the empty seat offset of the measurement drifts significantly (e.g., due to a change in orientation of the electrode and heater), the system may not accurately classify the occupant.

According to various exemplary embodiments, a sensing system for automotive occupant classification may use various conductors in the seat as sensing electrodes. For example, the sensing system may include a "sensor" conductor or assembly located proximate a "shield" conductor. These two conductors, often embodied in non-limiting examples as planar electrodes, are collectively referred to in this application as a non-limiting example of an "occupant classification sensor." In some non-limiting embodiments described herein, therefore, an "occupant classification sensor" may have at least two components, namely the sensor portion and an accompanying shield. The "sensor" and "shield" designations for either electrode may be reversed in any given embodiment.

According to other exemplary embodiments, a sensing system may use multiple electrodes on opposite sides of a thick piece of foam or any other elastomeric spacer. The electrodes themselves may be, without limitation, copper plates of appropriate thickness, e.g., copper tape. Measurements may be made while the electrodes are in various configurations. According to still other exemplary embodiments, a sensing system may combine or integrate weight sensing concepts with capacitive sensing concepts into a single system. The integrated system may use weight pressure information along with capacitive information to identify the occupant situation and produce a preferred classification.

Each of the electrodes in the seat back and seat bottom may be incorporated into a sensor pad or any other support structure. The sensor pad may include a layered structure. The sensor pad and sensing electrode may be constructed in a variety of ways, and the method of construction is not considered limiting. For example, the sensor pad may be constructed using a rigid or a flexible circuit board using known printed circuit board techniques such as etching or deposition of conductive materials applied to a dielectric substrate. Alternately, the sensor pad may be the foam cushion or seat pad itself with a discrete conductor, such as a conductive film, sheet or mesh, as the sensing element. As described above, the sensing electrode may function as the seat heating element so as to provide a comfortable seating environment for the occupant. If heating is included, a temperature sensor may be disposed near an output of the heating element, which may be used for controlling the temperature of the seat. The controller may include a temperature controller that incorporates a temperature measuring circuit which can receive measurements from the temperature sensor to determine the temperature of the sensor pad and a temperature generating circuit which may provide a signal to the heating element in order to control its operation so that a desired temperature of the seat can be maintained in a closed-loop process. The sensor pad may further include a shielding electrode for shielding the sensing electrode from interference from surrounding conductive components.

According to various exemplary embodiments, a sensing system may use electronic methods for making capacitive measurements (e.g., using high frequency current measurements or other methods). The sensor assembly materials may include any type of conductive material for the electrodes (e.g., copper, conductive inks, conductive fabrics, etc.) and any compressible material for the spacer between the sensor and the shield (e.g., non-woven felts, woven materials, foams, polymers, dielectrics, materials used to allow air flow for forced air climate control seats, or any other material that will significantly compress at pressures under 1 psi).

Referring to FIG. 1, a vehicle 10 is shown with an occupant 12 in a seat 14 of the vehicle 10, according to an exemplary embodiment. The seat 14 may include an occupant classification system 16 with the above described occupant classification sensor. As shown in FIG. 1, the occupant classification system 16 may generally be located in the seat 14 below the area in which an occupant 12 of the vehicle 10 sits, or may be located in other areas of the seat 14 or vehicle 10. FIG. 1 shows the sensor associated with a driver seat, but the sensor may be operable in any vehicle seat.

The occupant classification system 16 may generally include a sensor, a shield, and electronics for sensing and classifying the occupancy of the seat 14. For example, the sensor may be used to provide measurements that correspond to the effect of an object on the sensor due to both the conductivity and weight of the object. Measurements from the sensor may be evaluated to determine the existence of an object or occupant in the seat 14. The occupant classification system 16 may include or be configured to operate in conjunction with a seat heating system and/or other systems for the seat 14 of the vehicle 10.

The occupant classification system 16 may include a capacitive sensor or electric field sensor that includes a sensing electrode as described below in regard to FIG. 2. The capacitive sensor may generally be capable of sensing properties such as a proximity, position, or weight of an object, or the like. Various measurements from the sensing electrode may be used to detect the presence of an object in the seat. For example, the system may measure the change in capacitance (e.g., changes in an electrical property between two conductive objects). As an occupant 12 sits on seat 14, the system may detect a capacitance change to determine the presence of the occupant 12 by the occupant classification system 16.

Other exemplary embodiments of a capacitive sensor or electric field type occupant classification and detection system may be configured in various embodiments. One non-limiting illustrative system includes an upper electrode and a lower electrode for sensing an occupant. The system further includes electronics (e.g., sensing and signal conditioning electronics) configured to provide current or signals to drive the electrodes and to provide measurements on the electrodes. The occupant classification systems disclosed herein may include a controller, processor or electronic control unit (ECU) that controls the system and receives various measurements from the system components (e.g., the sensing electrodes). The controller is configured to interact with other vehicle systems such as, for example, vehicle safety systems (e.g., airbag and seat belt systems). The controller may provide a signal to a vehicle safety system that indicates whether an adult person is located in the vehicle seat so that safety devices may be activated if appropriate. The controller for the occupant classification system may be integrated with a controller for another vehicle system such as, for example, the controller used for a vehicle safety system.

Figure 2:
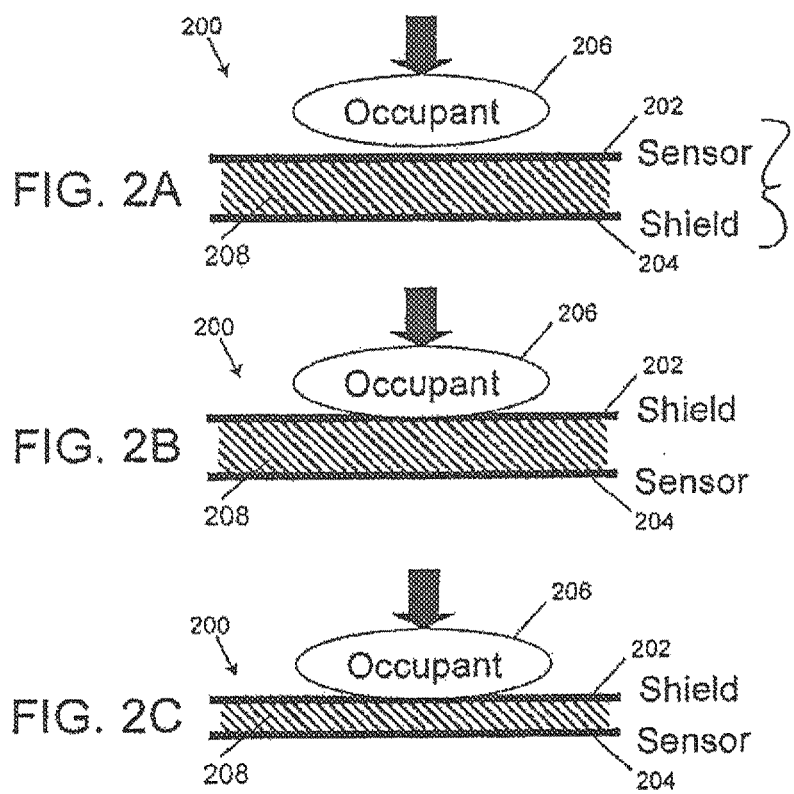
FIG. 2A is a cross section view of a capacitive occupant sensor for occupant detection as set forth herein with an occupant approaching the sensor.
FIG. 2B is a cross section view of a capacitive occupant sensor for occupant detection as set forth herein with the occupant in contact with the sensor.
FIG. 2C is a cross section view of a capacitive occupant sensor for occupant detection as set forth herein with the occupant changing the position of at least one portion of the sensor and causing a change in corresponding impedance for detection by a computer.

Referring more particularly to FIG. 2, an occupant classification system is described that uses a sensor (e.g., a capacitive vehicle sensor 200) to detect seat occupancy and to detect a weight on the seat. The occupant classification system may generally include a sensor 202 and a shield 204 with a dielectric layer 208 there between. For one embodiment accomplishing occupant sensing, the sensor may be oriented above the shield to reduce the influence that objects located under the shield (e.g., a seat heater) have on sensor measurements. The classification system may include a weight or force sensing capability. When sensing the weight, the sensor and shield may switch orientations (e.g., via electronic switching) with the sensor oriented below the shield to reduce the influence objects placed on top of the seat (e.g., electronic devices) have on sensor measurements. The occupant sensing and weight or force sensing measurements may be used together to determine whether an object on the seat is a person and may reduce the false detection of objects as people. As shown in FIGS. 2A-2C, weight placed upon and/or removed from the sensor change the distance between the sensor plates 202, 204 and the measured capacitance of the dielectric layer 208.

Figure 3:
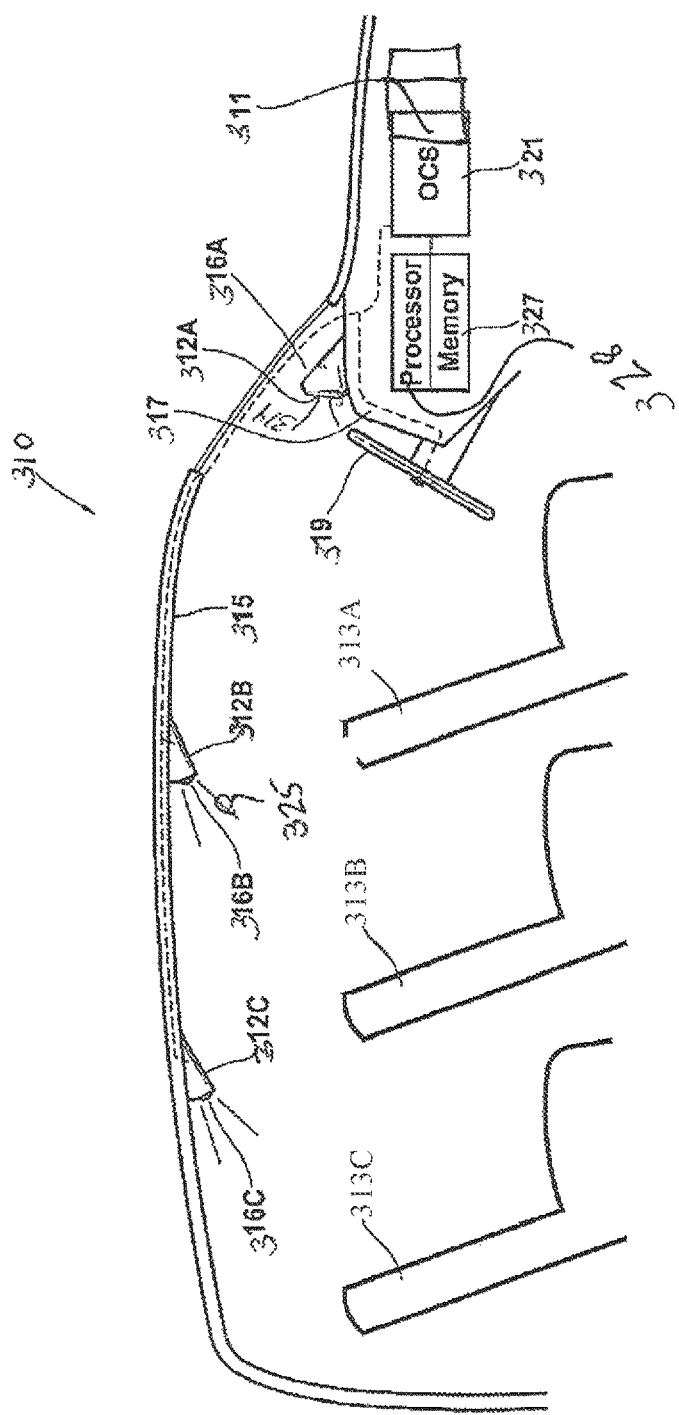
FIG. 3 is a schematic environmental depiction of an occupant monitoring system using imaging devices to detect physical aspects of occupants and vehicle components in a vehicle as set forth herein.

FIG. 3 is another overview schematic of a vehicle according to this disclosure including another non-limiting example of an Occupant Monitoring System that can be used with an Occupant Classification tool as discussed herein. In FIG. 3, rows of seats (313A, 313B, 313C) are located within the vehicle interior (310), or vehicle cabin, of a vehicle. The vehicle of FIG. 3 incorporates a driver' seat (313A) adjacent a steering wheel (319) and a common driver's control panel (317) (possibly including a viewing screen). The vehicle control system is not shown separately but would be implemented within a computer bank that includes processors (328), memory (327), electronic circuits, and at least one sensor necessary to establish a safe driving environment in the vehicle interior (310). The computers (311) in the vehicle may communicate with occupant classification systems (321) used to determine the entry/exit location, anatomy, age, adult/child/infant status, and other quantitative/qualitative characteristics of each occupant in the vehicle. The vehicle of FIG. 3 would typically include standard equipment from original equipment manufacturers (OEMs) such as seat belt assemblies shown in more detail in other figures. The vehicle of FIG. 3, however, illustrates installation of cameras (312A, 312B, 312C) having respective light sources (316A, 316B, 316C) and positioned in the vehicle interior (310) to establish respective fields of view (325) of occupants, seats (313), seat belt assemblies, and other structures in the vehicle. In this non-limiting example, the cameras/image sensors (312) (also known as optical sensors (312)) have been installed on the ceiling (315) of the vehicle and atop the driver's control panel (317). The vehicle includes the associated circuitry to connect the cameras (312), working in conjunction with light sources (316) and associated arrays/sensors (hereinafter "image sensors" (314)), to a vehicle control system operating via a computer bank of computers (311). As noted above, the camera systems and image sensors may utilize radar imagery for purposes herein.

The occupant classification system ("OCS") (321 in FIG. 3) may include numerous kinds of hardware, position sensors, pressure sensors, weight sensors, and the like to identify a vehicle occupant so that a vehicle meets regulatory requirements. Many traits of an occupant are currently identified by an OCS to assist in controlling air bag deployment as well as other restraint systems, alerts, and operational control signals. In non-limiting embodiments of this disclosure, images gathered pursuant to the methods and systems herein may be used in conjunction with an OCS to identify proper seat belt placement for many different levels of human development (e.g., adult, child, infant) as well as anatomy structures (large male, average male or female, small female). Optimal seat belt placement for these diverse occupants will be significantly different for each. An OCS may receive data from the computerized imaging systems described herein to conduct edge analyses to detect occupant forms, 3-D depth analyses for torso position, and anatomical dimensioning for seat belt confirmation relative to the occupant's body. Single camera and multi-camera systems for both seat belt monitoring and occupant classification are well within the scope of this disclosure.

One goal of the embodiments disclosed herein is to establish combinations of data values that are conveniently combinable to improve the safety performance of vehicle systems and to provide a basis for the warning systems or alert systems discussed below. In particular, the occupant classification system of this disclosure uses data from multiple occupant classification sensors ("OC sensors"), shown by way of non-limiting examples as OC sensors 521A, 521B, 521C in FIG. 5. Without limiting the disclosure, an OC sensor may be an electronic sensor, a weight sensor, a capacitive sensor, a light sensor, or an image sensor/camera as discussed above. Each of these OC sensors is configured to provide an output signal to a controller, or other microprocessor 501, via a respective sensing circuit 502 to assess a physical characteristic of an occupant in a vehicle seat or the lack of an occupant in the vehicle seat. The OC sensors may be strategically placed in the vehicle interior, steering wheel, vehicle seats, and other vehicle component constructions within previously identified zones to provide more than one output signal for comparison purposes, for statistical analysis, and to control other systems in the vehicle pursuant to safety regulations.

Figure 4:
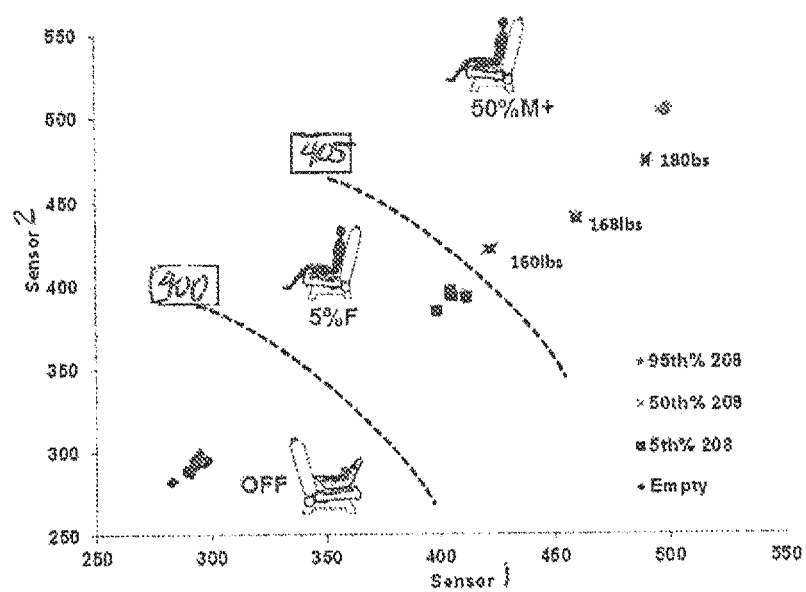
FIG. 4 is a schematic plot of input data received by a computer from classification sensors used to classify a vehicle occupant as set forth herein.

Overall, as noted above, placing multiple OC sensors in the vehicle provides opportunities to utilize the data provided by each OC sensor to define improved threshold boundaries for each classification necessary to identify the physical characteristics of an occupant in the seat. The occupant classification system set forth in this disclosure is particularly adapted to utilize threshold boundaries that have been absent from systems of the prior art. Notably, OC sensors may be utilized to establish threshold boundaries separating an empty or infant occupant of a vehicle seat from a 6 year old child in the seat, separating a 6 year old child classification from a $5^{th}$ percentile weight adult female classification, and separating a $5^{th}$ percentile weight adult female classification from a $50^{th}$ percentile weight adult male classification. FIG. 4 illustrates one graphical embodiment of multiple sensors, at least sensor 1 and sensor 2, providing data that places the occupant into an occupant classification system.

In general, and without limiting the scope of the embodiments of this disclosure, the current standards for occupant classifications include a 5th percentile adult female classification, which includes occupants having a weight of between 85 to 120 pounds; occupant classifications for a $50^{th}$ percentile male classification includes occupants having a weight of between 130 and 190 pounds. The system shown herein may also distinguish between a first child classification, which includes occupants having a weight of less than 20 pounds, a second child classification, which includes occupants having a weight of between 20 and 40 pounds, and a third child classification, which includes occupants having a weight of between 40 and 60 pounds.

Figure 5:
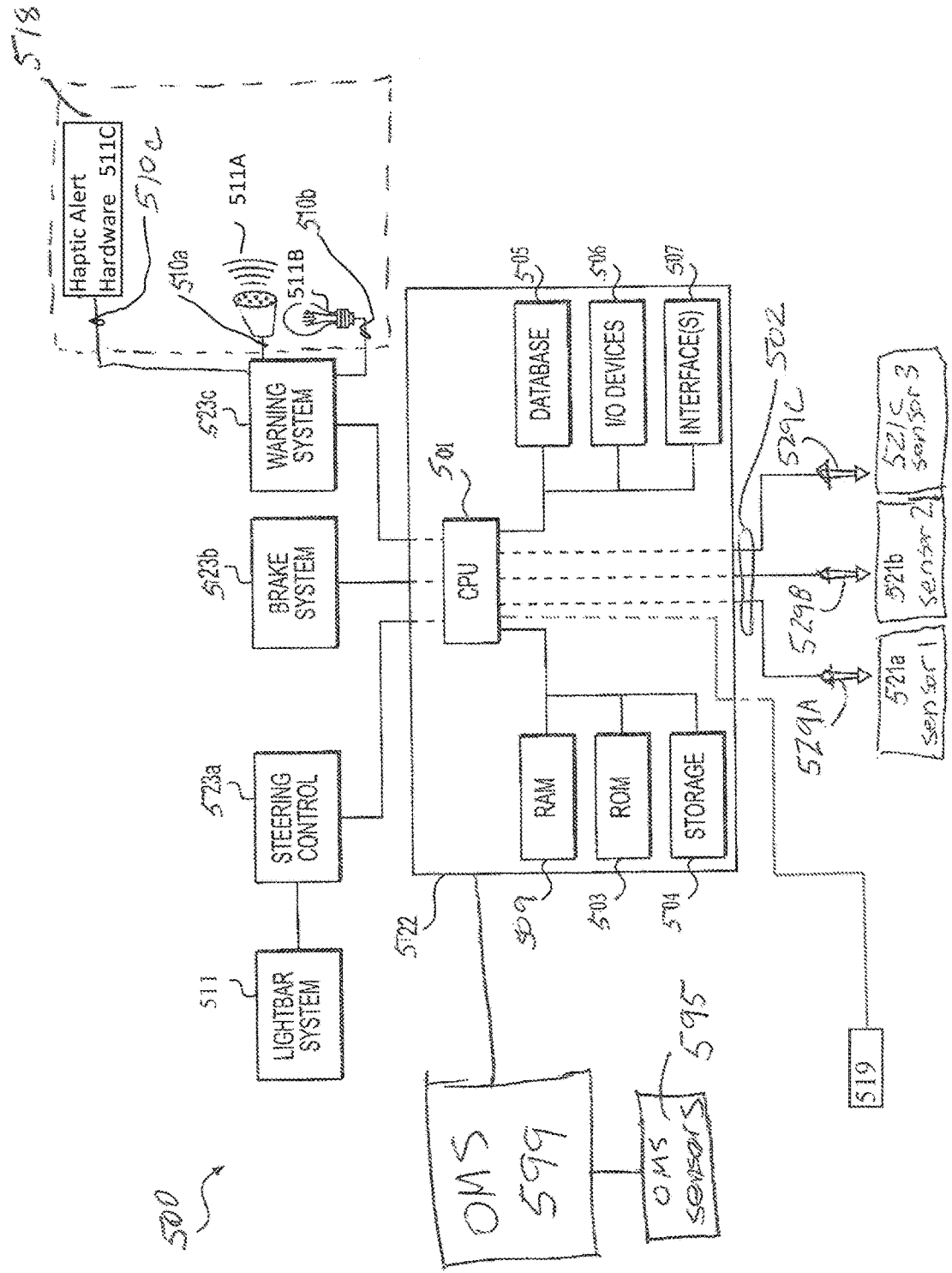
FIG. 5 is an overview schematic illustration of a vehicle sensor control system with an associated alert system as set forth herein.

With one goal of the embodiments of this disclosure being to utilize higher resolution thresholds between occupant classifications, an occupant classification system may be configured to use pairs of occupant classification sensors 521A, 521B, 521C of FIG. 5 (again, the "OC sensors") in numerous combinations to identify a vehicle occupant by a proper weight classification. Identifying the occupant with output from more than one OC sensor helps to minimize confusion between small adults and children and confusion between small adults and slightly larger adults whose weight lies between a $5^{th}$ percentile female and $50^{th}$ percentile male. The system is also better prepared to minimize any confusion between an occupant and conductive items on a vehicle seat (i.e., cell phones, computers, GPS accessories, and the like) that may change the electrical current response, such as capacitive or induction readings on a sensor in the vehicle seat.

Before using the occupant classification system in a vehicle, the threshold boundaries for the preferred occupant classifications are established with live test subjects and a plurality of output signals from numerous OC sensors. In the example shown in FIG. 4, and without limiting the embodiments to any one theory of operation, the test data for live subjects is plotted with an output signal value (or representative inductance value calculated for a respective OC sensor from the output signal) along respectively assigned x and y axes for each respective OC sensor output. The test data is calibrated so that each test occupant's known weight is associated with the coordinate system used to plot the test data (i.e., inductance values for each respective OC sensor along the x and y axes). By statistically analyzing the test data and the associated relations to threshold boundaries established by threshold data, the system described herein can use the threshold boundaries to calculate an occupant as fitting within a particular classification (infant or carrier seat, 6 year old child occupant versus $5^{th}$ percentile weight adult female occupant (boundary 400), and larger female versus $50^{th}$ percentile weight adult male (boundary 405)) may be established. In one non-limiting example, the threshold boundaries for each classification may be determined by midpoint or statistical mean analysis to plot the classification threshold boundaries in a classification system between the statistically significant test data points for various weights. The threshold boundaries may include tolerance levels, specified for any given application, to move the threshold boundary in one direction or another, thereby adjusting the occupant classification scope and resolution. Accordingly, the threshold boundaries are customizable for particular applications.

Upon customization of the threshold boundaries from live test data, as shown in FIGS. 4 and 5, the OC sensors 521A, 521B, 521C each provide output signals to the controller/microprocessor/CPU 501 that quantifies an electrical signal response present at that OC sensor in a respective zone of the vehicle seat. In the example of FIG. 5, each quantified electrical response can be plotted as a coordinate in a coordinate pair on the same coordinate system as the threshold boundaries as shown in FIG. 4. In this way, the system described herein is scalable in a way that other previously used occupant classification systems have not been.

Using pairs of OC sensors in selected zones of a vehicle seat structure allows for weighting of the zoned output signals emanating from each OC sensor in statistically significant ways determined empirically for particular applications. The output signals, bearing digitally recordable identification as emanating from one of the selected OC sensors in one of the selected zones, allows for not only higher resolution in occupant classification but also exponentially more combinations of data points to adjust other vehicle systems, particularly air bag deployment and seat belt signaling.

FIG. 4 illustrates just one coordinate system in which threshold boundary data 400, 405 may be compared against OC sensor data. This representation in FIG. 4 is merely an example for ease of explanation, and an occupant classification system may compare the data in computerized hardware without actually compiling an x and y axis plot. Statistical and data processing techniques may also be used to compile OC sensor data into multi-dimensional coordinate systems, multi-dimensional tables, computerized registers, and numerous other coordinate systems used to track and compare data points in a computerized system. Accordingly, it is well within the scope of the occupant classification system disclosed herein for computer hardware (processors, controllers, memory, graphics cards, and the like) to overlay data from many OC sensors and many pairs of OC sensors into one overall coordinate system to accomplish the objectives. The term "coordinate system," therefore, is not limited to graphical coordinates but may be represented in any computerized form subject to statistical and data processing techniques.

As discussed above, the OC sensors and associated computer system may be represented in a vehicle control system 500 of FIG. 5 to identify which occupants in a vehicle are adults (i.e., not children under a certain age) and which occupants are infants, toddlers, and children that are too young to exit a vehicle alone and should not be left unattended in a vehicle. Once the occupant classification is completed with a variety of sensor types, the controller/microcontroller/CPU 501 of FIG. 5 may use the occupant classification data to provide control signals to other systems including but not limited to a steering wheel lighting system (i.e., a "lightbar" 511), steering control and assisted driving algorithms 523a, a braking system 523b, and a warning system 523c discussed further in the below disclosure. The various systems receiving data and control information within the sensor control system 500 is not limited to those shown in FIG. 5 because the schematic representation of the control system therein is non-limiting and may include any other vehicle system that can be controlled from a computer in data communication with the vehicle components. The overall vehicle computer environment 522 may include not only the CPU 501, but other computerized components including but not limited to random access memory 509, read only memory 503, computer memory and storage 504, database and information storage structures 505, other input/output devices 506 and associated connections, as well as numerous computer interfaces 507 that interact with vehicle hardware.

This disclosure also takes advantage of the numerous kinds of Occupant Monitoring Systems, Occupant Classification Systems, and Occupant Classification Sensors as described in the above discussion and the associated figures. With so many tools to discern which occupants are adults and which occupants are children at various stages of development, methods and systems of this disclosure are fully functional to realize new warning systems within the vehicle. In certain non-limiting embodiments, this disclosure is particularly directed to warnings that can prevent adults and older children from abandoning younger children, pets, or other living creatures in a vehicle.

One example embodiment utilizes the various sensor data received from at least one sensing circuit 502 of occupant classification sensors 521A, 521B, 521C, the number of which is entirely optional. As shown in FIG. 5, computerized embodiments herein utilize computer programs having computer instructions that implement warning algorithms based on information regarding the classification of each occupant and other control data received by the CPU 501, particularly other control data indicating that the driver or last remaining adult or older child is exiting the vehicle. This other control data may include indicators from numerous vehicle sensors indicating that the vehicle has stopped or parked, the ignition has been switched off, audio-visual accessories have been switched off, park brake engagement, or image data showing occupants exiting the vehicle. This other control data 519 may be transmitted to the CPU 501 from numerous interfaces 507 connected to vehicle control sensors that are part of an overall vehicle control and communication system. All of this information may be utilized to implement a warning system 523C, particularly a warning system to prevent abandoning a child, a pet or animal, or even a person with a disability who is unable to exit the vehicle themselves and should not be left unattended. As shown in FIG. 5, the warning system may include or be in communication with or control an alert system 518 that utilizes at least one of an audible warning signal 510A, a visible warning signal 510B, or a haptic warning signal 510C. The signals 510A, 510B, 510C activate hardware components that make the alerts known to humans, including vehicle occupants or even other individuals outside of the vehicle. The audible warning hardware may be any kind of speaker for emitting audio signals. The visible warning hardware may be a light, a projected light feature with messages or any output that is perceived with the human eye as a message. The haptic warning hardware can include any kind of electrically operated vibration tool (e.g., microelectromechanical sensors, piezoelectric sensors, and the like) or heating tools that are sensitive to touch. Other kinds of touch based stimulus can also be generated with sound vibrations, electromagnetic energy, and the like.

In one example embodiment, a passenger protection system for a vehicle includes a vehicle sensor control system 500 having at least one processor 501 and computerized memory 504 storing vehicle control software therein, wherein the vehicle control software receives input data 529A, 529B, 529C from a plurality of vehicle sensors 521A, 521B, 521C, which may include occupant classification sensors, image sensors, or other control sensors within the vehicle. Using this sensor input data, the processor (i.e., CPU, microprocessor, or controller) 501 identifies a presence of at least one occupant 12, such as a passenger other than a driver in the vehicle, and that identification triggers a digital control sequence implemented by the CPU 501 and/or other vehicle control computers that are active during vehicle use. In one embodiment, the digital control sequence functions to issue at least one warning signal from a computerized warning system 523C in data communication with the CPU 501. The at least one warning signal is activated in a way that is likely to be noticed by an occupant 12, such as the driver or other passenger occupants in the vehicle, to alert the occupant 12 that at least one other passenger occupant, such as a child that needs care, is in the vehicle 10 and should be attended before everyone else exits the vehicle. The digital control sequence activates and de-activates an alert system 518 within the vehicle 10 that is useful to prevent forgetting an occupant in the vehicle when that occupant cannot take care of themselves and/or cannot exit the vehicle themselves. The warnings may take on any form, placement, frequency, volume, intensity, or other characteristics, but in one non-limiting embodiment, the alert system 518 implements warning signals 510A, 510B, 510C on or near a door 600 of the vehicle 10 where an adult would exit. In some embodiments, the warning signals 510A, 510B, 510C emanate from a door 600 of the vehicle that would be used by a driver. The warning signals, however, may be activated from any position in the vehicle that is appropriate to alert any occupant exiting the vehicle that another dependent occupant is being left behind. In the embodiments of this disclosure, the alert system 518 includes hardware and vehicle components that provide at least one of an audible alert 511A and/or a visible alert 511B and/or a haptic alert 511C on or near the door 600 of the vehicle 10 because the door is often the object of a vehicle occupant's attention when exiting a vehicle. The audible alert may be any sound that is perceptible by a vehicle occupant and easily interpreted as requiring attention, such as, but not limited to, an automated voice attendant, a beeping sound, a siren sound, or any other audible input to the vehicle occupants. The visible alert may include any number of lighting arrangements that are positioned and colored to catch attention of occupants before exiting the vehicle. A haptic alert may be any signal that can be perceived by touch, such as vibrations, to provide an indicator that an occupant is possibly being left in the vehicle by accident. The digital control sequence, implemented by computerized instructions in software, may activate the alert system 518 and associated warning signals or alerts 510A, 510B, 510C in any order, i.e., simultaneously, sequentially, and in any combination. In one non-limiting example, the order of alerts may increment as time passes or upon the sensor control system 500 utilizing input data 529 to determine that events within the vehicle are progressing toward an occupant such as the driver leaving the vehicle with a child therein. The input data may originate from numerous sensors and images described above and may further include door sensors indicating that the door is opened and the driver is moving out of the driver seat in the vehicle. In one example, an alert sequence may include the visible alert 510B, followed by the haptic alert 510C, followed by the audible alert 510A.

Figure 6:
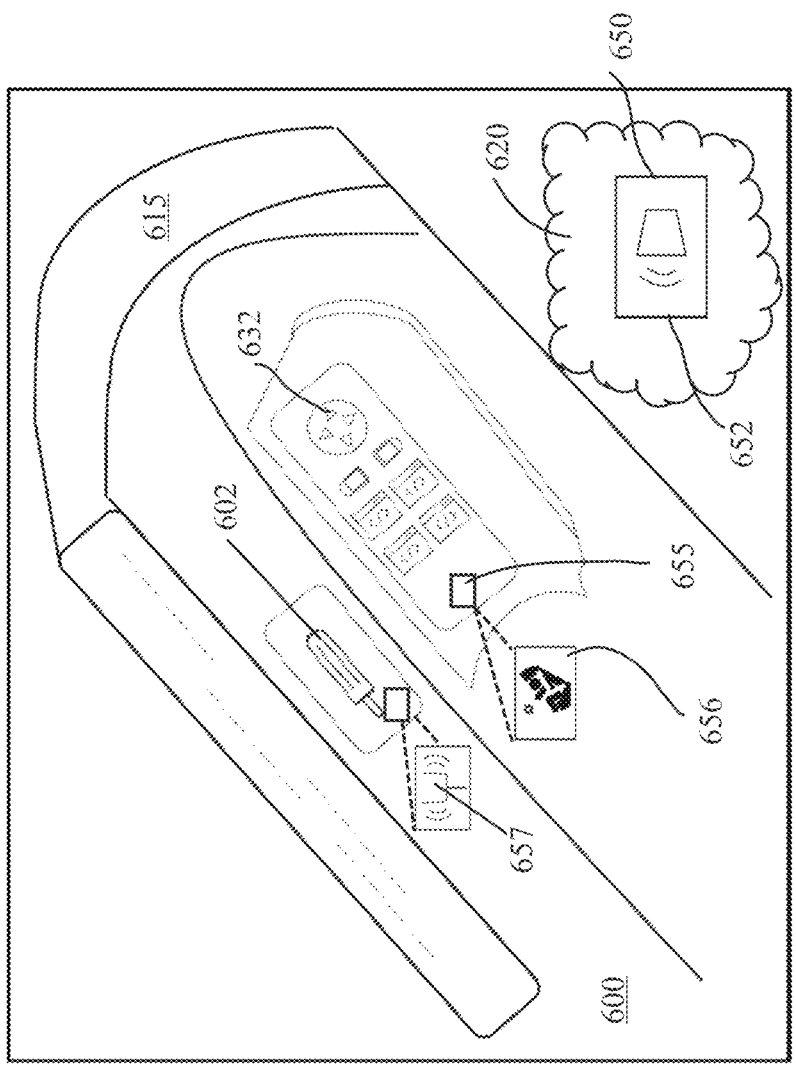
FIG. 6 is a side view of a vehicle door configured with warning alert hardware as disclosed herein to prevent leaving a child occupant unattended in a vehicle.

Example embodiments are illustrated for example in FIG. 6 and may utilize audible alerts 650 emanating from a vehicle speaker 620 that is also connected to audio-visual accessories in the vehicle 10. The speaker 620 may include a computerized voice attendant that speaks commands and verbal warnings such as "occupants remain" upon certain triggering input data 529A, 529B, 529C. The input data in one example triggers the audible alert 650 if a warning is activated because the driver door 600 has been opened. In some embodiments, the alert system 518 provides a respective button 652, 656, 657 for a user to acknowledge each warning which may cause the corresponding alert, whether audible, visible or haptic, to stop or revert to a different status. The same or a similar button may include functionality to implement a bypass function triggered by a touch event by the driver, such as holding the respective button for a predetermined period of time, to temporarily halt warnings. The halt in warnings could be useful in situations when a driver and/or other adults in a vehicle are temporarily exiting a vehicle to do short term activities outside the vehicle like pump gas, retrieve items from the vehicle trunk, or quickly stop at a store or rest area. The bypass function may also be initiated through gestures that are recognized within image data as described herein.

The computerized systems of this disclosure, including imaging systems, vehicle control systems, child protection software programs, and digital control sequences include computer implemented instructions stored on computer memory and activated by a processor to achieve a particular result with a computer system. A digital control sequence can be any software program that runs a sequence of computer implemented instructions to elicit certain inputs and produce electronic outputs.

The vehicle sensor control system 500 uses computerized components to implement the digital control sequence that activates the alert system 518. The alert system 518 uses the digital control sequence to activate monitoring and alerting vehicle occupants in a passenger protection system as described herein. To accomplish the alerts, an overall passenger protection system illustrated generally at FIG. 5 is in electronic communication with an occupant monitoring system (the above noted OMS) and/or an occupant classification system (OCS) having at least one occupant classification (OC) sensor detecting the presence of the occupant other than the driver or other adults in the vehicle. The occupant monitoring system includes at least one imaging device 312 and light sources 316 identifying the driver and the at least one occupant other than the driver. The OC sensor may include any of a weight sensor, capacitive sensor 200, or any other tracking device by which the CPU of the sensor control system can be activated by the presence of adults and children in the vehicle.

Figure 7:
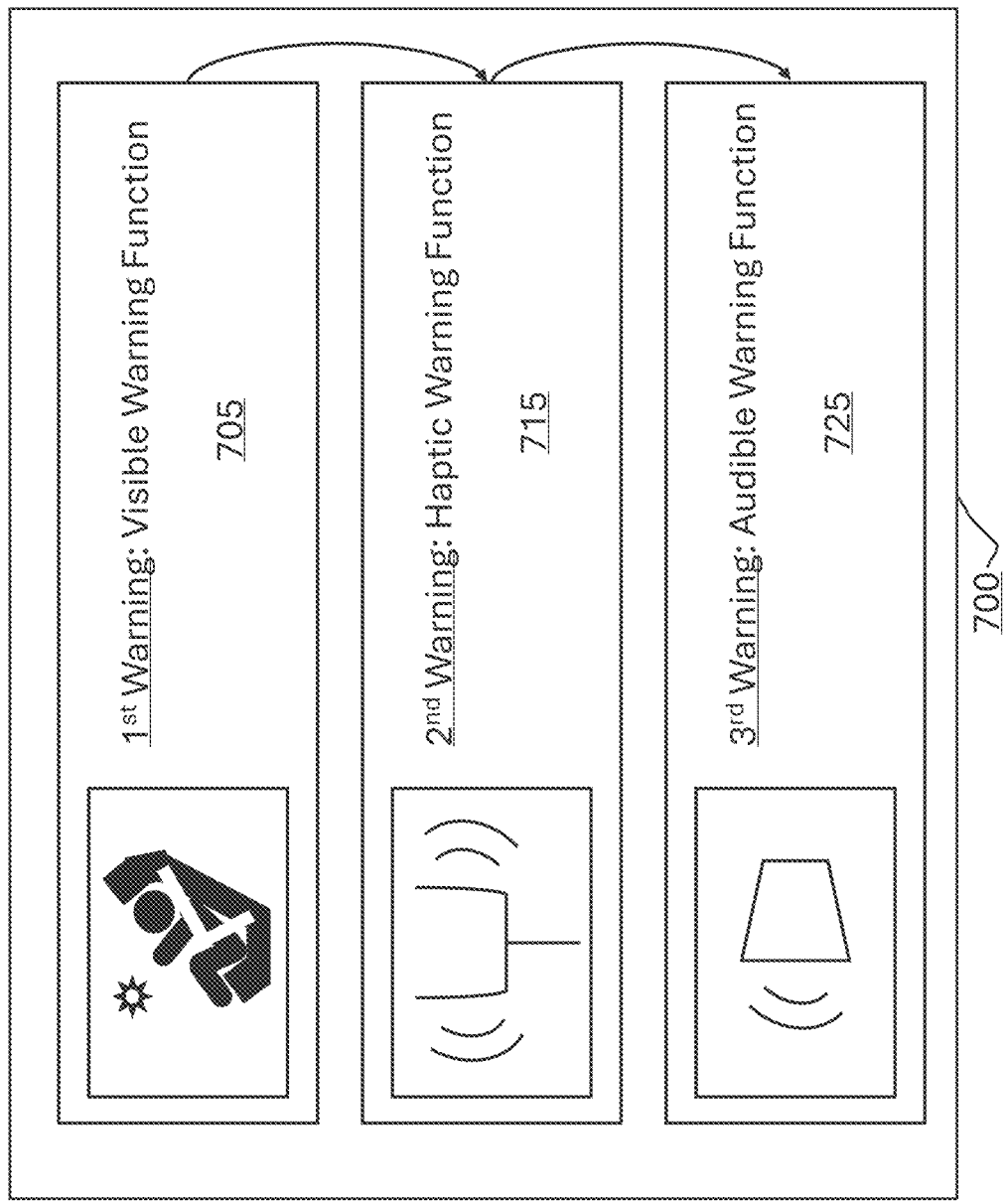
FIG. 7 is a flow chart depicting the warning alert system of this disclosure.

As illustrated by the digital control sequence 700 of FIG. 7, in one non-limiting embodiment, the alert system 518 includes a visible warning function 705 that may be associated with a visible warning button 656, a haptic warning function 715 associated with a haptic switch button 657, and/or an audible warning function 725 emanating from a speaker 620 in the vehicle when the door is opened or another triggering event. The audible warning function 725 may be associated with an audible warning button 652 as shown in FIG. 6. The visible warning button 656, the audible warning button 652, and the haptic switch button 657 may be placed in any appropriate location to provide the best alerting function in a given vehicle. In the example of FIG. 6, the visible warning button 656 may be positioned proximately to a bank of window switches 632; the audible warning button 652 is positioned proximately to a vehicle speaker 620, optionally the speaker in a door 600, and the haptic switch button 657 is positioned in a place that a user is likely to touch before exiting a vehicle, such as the door handle 602 of FIG. 6. All of these functions can also be completely turned off by a manual reset button that may be visible in a driver's console. The buttons of this disclosure may be mechanical or MEMS types of digital buttons.

In another embodiment, a passenger protection system for a vehicle includes a vehicle sensor control system 500 in data communication with at least one processor 501 and computerized memory/computerized storage 504 for storing vehicle control software therein, wherein the vehicle control software receives input data 529 from a plurality of vehicle sensors 521. An occupant monitoring system 599 is also connected to and in data communication with the plurality of sensors 521 configured to identify a presence of a driver and at least one other occupant in the vehicle, the occupant monitoring system 599 further having additional sensors 595 classifying the driver and the other occupant according to a passenger classification system stored in the software. A digital control sequence may be triggered in the software by a presence of the at least one occupant other than a driver in the vehicle, the digital control sequence activating and de-activating an alert system 518 within the vehicle. The alert system may include at least one of an audible alert 510A and/or a visible alert 510B and/or a haptic alert 510C. These alerts may be associated with corresponding hardware positioned on or in proximity to the at least one door 600 of the vehicle. Additional sensors, whether OC sensors or OMS sensors, classifying the driver and the other occupant, configure the software to utilize the digital control sequence 700 when a child is present in the vehicle, and that child is likely not able to care for themselves, cannot exit the vehicle by themselves, and should not be left unattended in a vehicle after all other occupants leave. As noted above, the additional sensors may include image sensors and other occupant classification sensors that classify the driver and the other occupant according to weight or size. The additional sensors and associated input data classifying the driver and the other occupant may be at least one of an imaging device, a seat belt sensor, a size sensor, a weight sensor, a capacitive sensor, and the like.

In other embodiments, the sensors 521 and additional sensors 595 may provide input data 529 related to a child occupant positioned on in an infant seat, a child car seat, or a toddler booster seat, as discussed in the above disclosure. In non-limiting embodiments, the weight or size indicates a classification selected from a one year old child, a three year old child, a six year old child, a 5th percentile female, and a 50th percentile male such as shown in FIG. 4.

This example embodiment may utilize any of the features discussed above, and at least one of the audible alert signal 510A and/or the visible alert signal 510B and/or the haptic alert signal 510C may originate from at least one door 600 of the vehicle operated by either the driver or another occupant classified as an adult, particularly when the adult is exiting the vehicle. The adult exiting the vehicle may be a vehicle driver or any other adult or independent child of an age to exit the vehicle last, possibly leaving a smaller child in the vehicle accidentally.

FIG. 7 illustrates how a digital control sequence 700 may be used in a computer implemented method of preventing trapped passengers in the vehicle by first identifying a presence of a driver and at least one other occupant in the vehicle. The digital control sequence may be part of, or in communication with, an overall child protection software program that is stored in at least one computer. The child protection software program includes appropriate computer implemented commands stored in memory and in communication with all of the other systems described herein. The digital control sequence and the child protection software program work with computer hardware and other software programs to send and receive commands, i.e., instructions in the form of digital and/or analog data.

When the at least one other occupant is a child that should not be left unattended in the vehicle, instructions in software implemented by a computer and processor 501 in the vehicle activate an alert system 518 on at least a door 600 of the vehicle. The alert system 518 may be at least one of an audible alert and/or a visible alert and/or a haptic alert on the door of the vehicle. Other positions for the alerts are also within the scope of this disclosure (i.e., using the vehicle horn or lights or sending remote alerts to a user's mobile device or cell phone). The method includes tracking respective positions of the driver and the at least one other occupant in the vehicle, such as by using image data to monitor occupant positions in the vehicle and possibly tracking vehicle operations with corresponding sensors 521, 599. All of the input data may be received by at least one processor 501 in the vehicle, stored in computerized memory, and used to populate instructions in control software. A computer uses the input data to determine that at least one of the driver and/or the occupant is exiting the vehicle and initiates the digital control sequence 700 to provide the at least one of the audible alert and/or the visible alert and/or the haptic alert on at least one door of the vehicle prior to the exiting. In one non-limiting embodiment, the digital control sequence activates the alerts in an order such that the visible alert is followed by the haptic alert followed by the audible alert, until at least one of the driver and/or the other occupant provide manual feedback acknowledging respective alerts. In one example, in the absence of the manual feedback, the alert system provides audible warnings and/or visible warnings that are discernible from outside the vehicle. The acoustic warnings and/or visible warnings originate from at least one of a vehicle horn, vehicle headlights, or even a user's cell phone.

In other non-limiting embodiments, using a suitable imaging system (radar, 2D, or 3D vision, etc.), a fail safe gesture, which can be detected in suitable image data from image pixels of the imaging system, can be trained to activate or deactivate an alert system. The term image pixels is used in its broadest sense to include all imaging data subunits (e.g., voxels). In at least one embodiment, the gesture may be a physical motion, body part positioning, or other physical indication from an occupant that is detectable to begin the de-escalation of the child protective device (CPD) alarm in the vehicle when a false positive event has occurred because of an adult in the vehicle being misidentified as a child. In this case, a predetermined motion can be made by the adult occupant in the vehicle to pause or abate the advancement of the CPD escalation protocol enacted by the Tier 1 manufacture.

The gesture alone is too insecure, however, as children will inevitably be able to watch and replicate movements of the adult for de-escalation. By utilizing a standard posture with which one can ensure highly accurate classification, one can improve the false alarm rates of child safety alerts. Making certain that this gesture is "location agnostic," e.g., not dependent on being in the driver seat, would be one useful result in providing a convenient and safe way for an occupant to override the warning system, regardless of the occupant's location inside or outside of the vehicle, so long as the gesture is within a field of view of the camera and originating from an authorized occupant.

This innovation also allows for lower fidelity sensors to reduce the rates of false positives when an adult occupant is the triggering the false positive. This confirmation of accuracy combines a gesture with a specific pose that allows the low fidelity sensor to have a higher chance of successful classification to better address highly dynamic cabin environments that may confuse lower fidelity sensors like radars. Non-limiting advantages of the embodiments described herein include providing end customers with a digital switch of sorts that does not require relocation of the occupants to disable all together or at least acknowledge and disarm the warnings and alarms described in this description of the embodiments.

In regard to the above noted posture or pose that an occupant must present in an image to disarm a warning system, this disclosure incorporates by reference U.S. Pat. No. 10,611,335 (Cech 2020) from patent application Ser. No. 15/980,628. The commonly owned '628 application discloses details of using imaging technology inside a vehicle to detect and monitor positions of occupants relative to vehicle components, such as seat belts and seat belt payout apparatuses. The technology of that disclosure is enabling to determine an occupant's size, position, and movements so that a posture or pose identified within image data can confirm important aspects of the warning system described herein. For example, a combination of a particular body gesture and an occupant position relative to a vehicle component can confirm that an adult is making certain gestures from particular locations, including both driver seats and all passenger seats. The gesture can then be used to disable or disarm a warning that a child is present or in an unsafe condition. The same technology reduces false negatives and false positives regarding the warning system by confirming not only a presence of an adult but whether that adult has been confused for a child.

Figure 8:
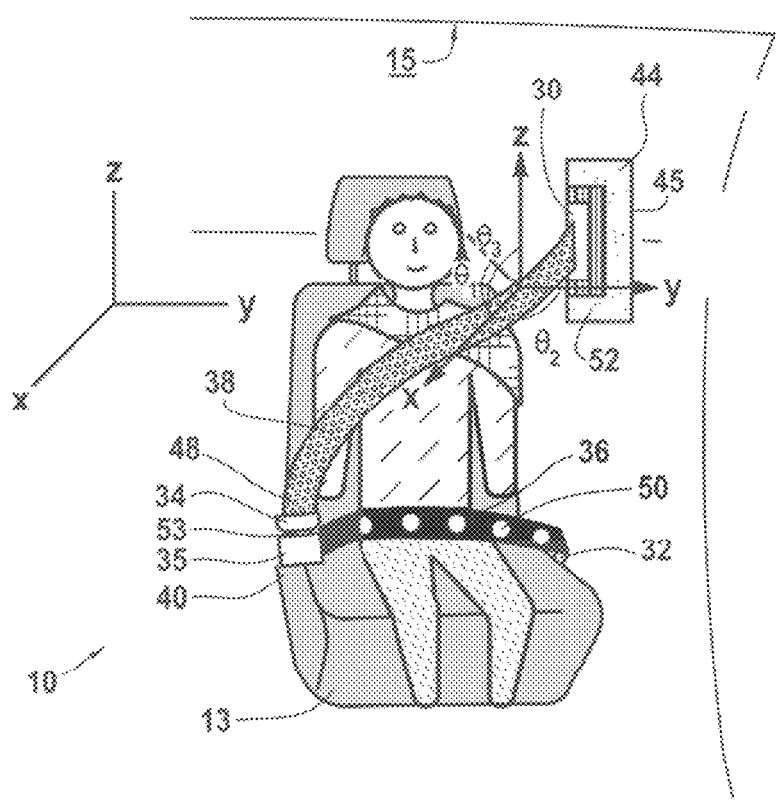
FIG. 8 is an example image used to show occupant positions relative to components in a vehicle.
Figure 9:
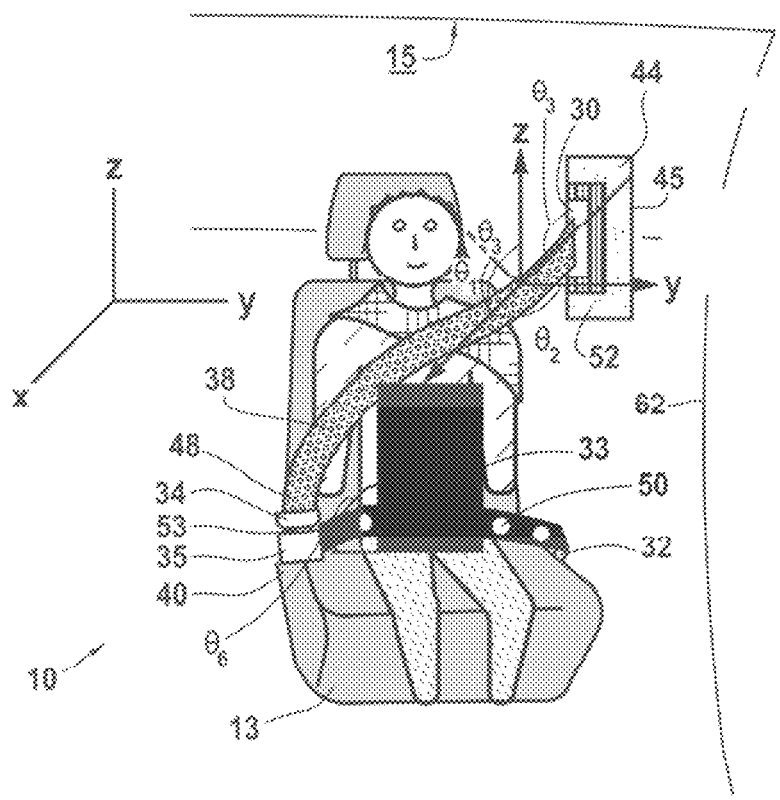
FIG. 9 is an example image used to show occupant positions relative to components in a vehicle and other items inside the vehicle as well.
Figure 10:
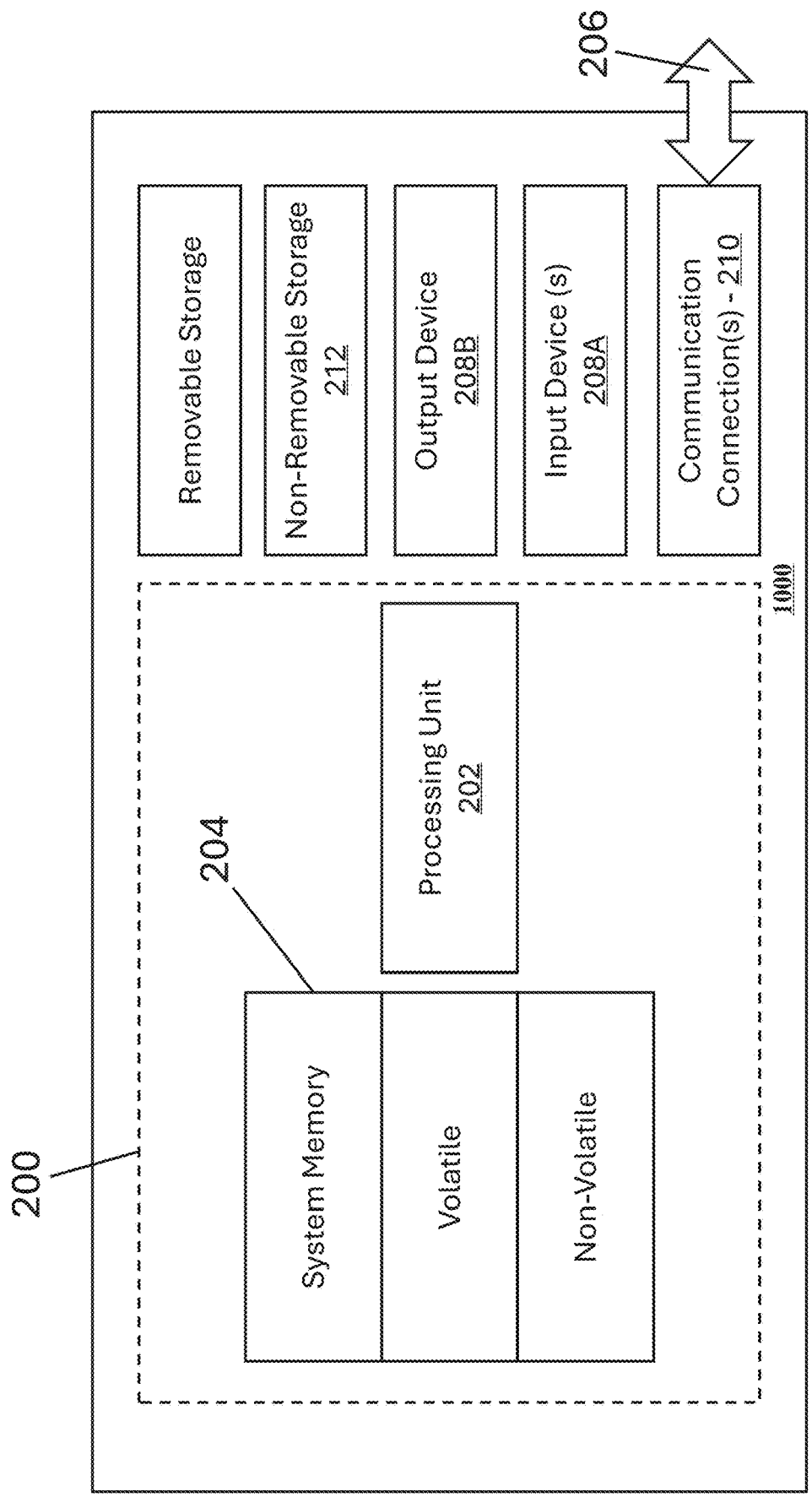
FIG. 10 is a schematic showing an example computer environment used to enable the embodiments of this disclosure.

FIGS. 8 and 9 illustrate an example of a three-dimensional analysis of a vehicle occupant in a vehicle seat (813) and utilizing the components of the seat belt assembly (820) to confirm an occupant classification as an adult. An image as shown may be constructed with sufficient levels of detail to distinguish patterns on numerous components of the seat belt assembly (such as the different patterns (848, 850) on the shoulder strap (838) and lap strap (836)). In one non-limiting embodiment, a radar image of the components of the seat belt assembly, as well as the occupant's body, is shown with sufficient clarity to model the interior of the vehicle at this seat (i.e., at this region of interest) in a three dimensional coordinate system. Such mapping to a coordinate system allows for computer software to calculate spatial measurements for each frame of an image as well as tracking motion across pairs of images. This tracking allows for the above noted discernment between adults and children due to poses and positions relative to components inside the vehicle. In the non-limiting example of FIG. 8, a computerized method implemented by the system disclosed herein calculates numerous angles useful in identifying proper seat belt use for a child and an adult or corresponding improper seat belt use. The spatial occupant positions and postures by taking measurements within a series of images. The measurements may include distances from a camera (812) to a portion of the occupant's body (i.e., torso receiving a shoulder strap), distances between components of the seat belt assembly (820) and portions of the occupant's body, and angles between structures within the vehicle, the occupant's body, and the seat belt assembly. For example, without limiting this disclosure, FIG. 8 illustrates a method of calculating a first angle (Theta 1) between an occupant's shoulder and a longitudinal axis along the seat belt, a second angle (Theta 2) between the longitudinal axis of the seat belt and a referenced horizontal axis for the coordinate system, a third angle (Theta 3) calculated between a portion of the occupant's head and the longitudinal axis of the seat belt. These kinds of static measurements are mere examples of the system gathering data points to use in determining beginning, intermediate, and final positions of occupants' respective bodies relative to vehicle components, such as seat belt components in a respective vehicle. This data can then be used to prepare and issue associated alerts or warnings to the occupants, control air bags and other restraint systems, and update data to help an OCS verify classifications of occupants in the vehicle. Significantly, this data can be used to verify commands that occupants issue to a vehicle control system using gestures and body motions that can be interpreted by a computer analyzing the image data.

FIG. 9 illustrates the image of FIG. 8 with the addition of an obscuring object (833) placed in the lap of an occupant. The obscuring object may be a blanket, cargo, food, pets, or any item that hides a portion of the seat belt assembly from view in the image. In this scenario, the methods and systems disclosed herein use the above described spatial measurements and angles along with available views of the seat belt components that have not been obscured to predict an occupant classification as an adult, a dependent child, or an independent child that can operate vehicle doors, horns, and lights to avoid be left in a vehicle. The system may utilize additional angle measurements for components that are readily discernible in the image. One aspect of this disclosure includes preparing patterns of known reflectivity and luminance on seat belt components and other structures in the vehicle to provide numerous avenues of calculating occupant body positions, occupant classifications as adults or children, as well as body motions and gestures from areas that are most often unobstructed during use. For example, the payout aperture (830) and aperture pattern (852) would still be readily available in the image as shown in FIG. 6 to calculate Theta 5 as the angle between a webbing payout section (844) along an area of a b pillar of the vehicle and a seat belt payout exiting the payout aperture (830). Similarly, the angle (Theta 6) between a shoulder strap (848) and a lap strap (836) remains discernible along the buckle region (840) of the seat belt assembly. By associating the reflective patterns in strategic locations relative to cameras (812) installed in the vehicle interior (810), the system will gather sufficient image data from unobstructed regions to confirm computer commands issued by an occupant in the form of gestures, body motions, and the like to control vehicle systems such as child safety software programs in use within the vehicle.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

In example implementations, at least some portions of the activities may be implemented in software provisioned on a networking device. In some embodiments, one or more of these features may be implemented in computer hardware, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

The invention claimed is:

1. A passenger protection system for a vehicle, comprising:
    a vehicle control system comprising at least one processor and computerized memory storing vehicle control software therein, wherein the vehicle control software receives input data from a plurality of vehicle sensors;
    an imaging system connected to the vehicle control system and gathering image data from an interior of the vehicle, the image data being gathered from pixels of the imaging system corresponding to vehicle occupants and vehicle components within the interior of the vehicle;
    a digital control sequence triggered in the software by a presence of at least one occupant in the vehicle, the digital control sequence activating and de-activating an alert system in the vehicle in accordance with a child protection software program stored in the computerized memory, wherein the alert system comprises at least one of an audible alert, a visible alert, or a haptic alert within the vehicle; and
    wherein the image data comprises a gesture from the at least one occupant, and the child protection software program interprets the gesture as a command that produces a respective electronic outputs from the digital control sequence to activate, deactivate, and temporarily halt the alert system; and
    wherein the digital control sequence uses the input data from the vehicle sensors or the image data to determine that events within the vehicle are progressing toward an occupant leaving the vehicle with a child therein and activates the alarm system.

2. The passenger protection system of claim 1, wherein the gesture produces, via the digital control sequence, the electronic output that activates and deactivates the alert system.

3. The passenger protection system of claim 1, wherein the digital control sequence is in electronic communication with an occupant monitoring system comprising at least one sensor detecting the presence of the occupant other than the driver in the vehicle.

4. The passenger protection system of claim 3, wherein the sensor and the imaging system identify the driver and a different occupant other than the driver.

5. The passenger protection system of claim 4, wherein the imaging system classifies the driver and/or the different occupant according to categories of adults and children in the vehicle.

6. The passenger protection system of claim 5, wherein the child protection software program comprises a bypass function triggered by the image data denoting a gesture from either the driver or the different occupant.

7. The passenger protection system of claim 6, wherein the child protection software program confirms the trigger of the bypass function by determining that a classification of the occupant presenting the gesture is an authorized adult to deactivate the alert system.

8. The passenger protection system of claim 7, wherein the child protection software program comprises computer implemented instructions that confirm the trigger of the bypass function by comparing the position of the body of the occupant presenting the gesture with vehicle components portrayed in the image data.

9. The passenger protection system of claim 2, wherein the digital control sequence comprises input data from the occupant monitoring system indicating that an occupant is leaving the vehicle, and
    the electronic output activates the audible alert, the visible alert, and the haptic alert in a sequential order accordingly.

10. The passenger protection system of claim 9, further comprising a manual reset button for the occupant to acknowledge and turn off respective alerts.

11. A passenger protection system for a vehicle, comprising:
    a vehicle control system comprising at least one processor and computerized memory storing vehicle control software therein, wherein the vehicle control software receives input data from a plurality of vehicle sensors;
    an occupant monitoring system comprising a plurality of sensors and an imaging system configured to identify a presence of a driver and at least one other occupant in the vehicle, the occupant monitoring system further comprising additional sensors classifying the driver and the other occupant according to a passenger classification system stored in the vehicle control software;
    a child protection software program stored in the memory and in communication with the occupant monitoring system and the vehicle control software, the child protection software program comprising an alert system that is triggered by a presence of at least one occupant classified as a child passenger;

a digital control sequence programmed in the computerized memory and utilized by the vehicle control system to activate, deactivate, and temporarily halt the alert system, wherein the digital control sequence is configured to receive commands from image data gathered by the imaging system, and;

wherein the digital control sequence receives commands from the image data by electronically recognizing body motions from an authorized occupant within the image data;

a manual reset button sending additional commands to the digital control sequence that turns off the alert system after activation, wherein the digital control sequence is configured to confirm that the commands and the additional commands originate from an authorized occupant before activating, deactivating, or temporarily halting the alert system.

12. The passenger protection system of claim 11, wherein the digital control sequence confirms the commands by determining which respective occupant presents the commands in the image data, determining the classification of the respective occupant presenting the commands, and determining a body position of the respective occupant presenting the commands.

13. The passenger protection system of claim 12, wherein the body position of the respective occupant is determined from the image data relative to vehicle components in the image data.

14. The passenger protection system of claim 13, wherein the body position of the respective occupant comprises a spatial location of the occupant in the vehicle relative to the vehicle components.

15. A computer implemented method of providing warnings from an occupant monitoring system in a vehicle, the method comprising:

identifying a presence of a driver and additional passengers in the vehicle with an imaging system gathering image data;

using the image data to trigger a digital control sequence that activates, de-activates, and temporarily halts an alert system in a computer connected to a vehicle control system in the vehicle, wherein the digital control sequence is in communication with a child protection software program;

using the child protection software program to activate or deactivate the alert system in the vehicle on the basis of at least one other occupant in the vehicle being an infant, a toddler, or a child; and upon activating the alert system, implementing respective vehicle components to produce at least one of an audible alert, a visible alert, or a haptic alert in the vehicle; and wherein the child protection software program comprises a bypass function triggered by a touch event on a button or the image data denoting a gesture from either the driver or a different occupant, wherein the bypass function temporarily halts the alert system; and wherein the child protection software program confirms the trigger of the bypass function by determining that a classification of the occupant presenting the gesture is an authorized adult to temporarily halt the alert system.

16. The computer implemented method of claim 15, further comprising classifying the at least one other occupant as an infant, a toddler, or a child from the image data.

17. The computer implemented method of claim 16, further comprising utilizing at least one sensor of a vehicle control system with the occupant monitoring system to classify the driver and the at least one other occupant.

18. The computer implemented method of claim 17, further comprising using additional sensors connected to the occupant monitoring system to classify the driver and the at least one other occupant.

19. The computer implemented method of claim 15, further comprising deactivating the alert system by delivering the manual feedback with a touch event on a manual reset button.

20. The computer implemented method of claim 15, wherein the manual feedback is a gesture interpreted as a command to the digital control sequence that elicits an electronic output for deactivating the alert system.

* * * * *